May 12, 1970     S. W. FORD ET AL     3,511,524
METER SETTER
Filed Sept. 5, 1968
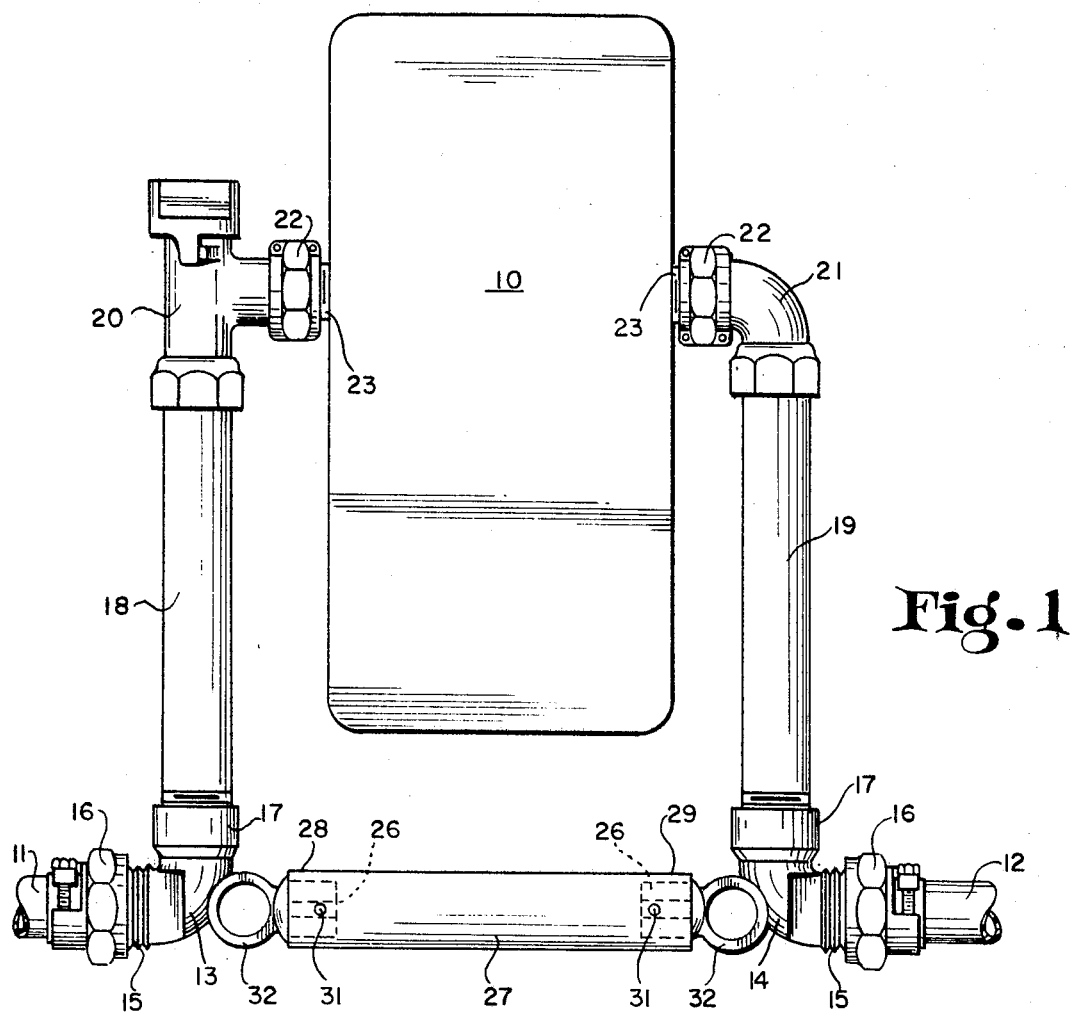
Fig. 1
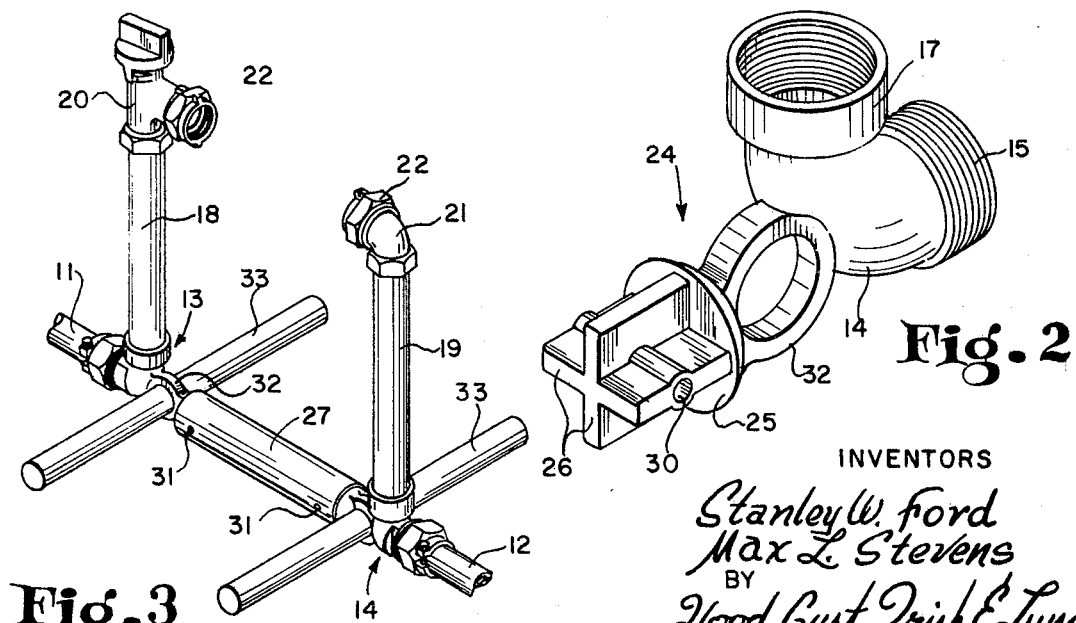
Fig. 2
Fig. 3
INVENTORS
Stanley W. Ford
Max L. Stevens
BY
Hood, Gust, Irish & Lundy
ATTORNEYS

# United States Patent Office 3,511,524
Patented May 12, 1970

3,511,524
METER SETTER
Stanley W. Ford and Max L. Stevens, Wabash, Ind., assignors to The Ford Meter Box Company, Inc., Wabash, Ind., a corporation of Indiana
Filed Sept. 5, 1968, Ser. No. 757,730
Int. Cl. F16l 55/00
U.S. Cl. 285—30      5 Claims

ABSTRACT OF THE DISCLOSURE

A meter setter designed primarily for supporting and connecting a meter in a fluid supply line of plastic conduit and comprising means independent of the supply line for protecting the elements of the supply line against torque stresses which might otherwise be impressed thereon by reason of the fact that the meter is supported above the axis of the supply line.

Summary of invention

Water meters and similar devices have long been customarily connected in supply or service lines, and have been supported from such lines, by various types of setters which, being connected in the line, include risers for connection to the meter or similar device in such a way as to support the meter or similar device above the line and in position for ready removal from the line and for facile reading, adjustment or repair. Various setter structures such as, for instance, those disclosed in U.S. Pats. Nos. 1,988,003; 2,165,626; 2,461,888 and 2,892,641 have been widely used with iron pipe line and copper pipe lines and have been very successful and satisfactory in such environments.

However, the use of plastic conduit has recently become increasingly widespread; and it is found that previously-known setter devices have not been wholly successful or satisfactory in that environment, primarily for the reason that such plastic conduit inherently possesses a relatively low resistance to torque strain. As a consequence, when previously-known setter devices are associated with a supply or service line formed of plastic conduit, to support a meter or other relatively heavy device in offset relation above such line, it is found that the meter is likely to sag to one side or the other out of vertical alignment with the line.

A primary object of the present invention, then, is to provide an improved meter setter particularly adapted for use with plastic conduit. A further object of the invention is to provide such a setter which, as inexpensively as possible, will effectively support a meter or similar device in vertical alignment above a plastic conduit line in which such setter is connected.

Still another object of the invention is to provide a novel fitting for use in such a setter, said fitting being in the form of an elbow with integral prong means aligned with one arm of the fitting and adapted to be non-rotationally received in one end of a connector means whereby, when two such fittings are allochirally arranged with their prong means so received in opposite ends of such a connector means, the two fittings will lend support to each other against relative rotation about the common axis of said prong means.

Still antoher objeect of the invention is to provide, in such a fitting, integral means for the reception of foot means so constructed and arranged as to restrain each fitting individually against rotational movement about the axis of its one arm.

Thus, the invention resides in the provision of vaned prong means, rigid with elbow fittings and coaxial with one arm thereof, for non-rotational reception in the unthreaded, hollow ends of a connector element, and/or the provision of eye means on such fittings for the reception of foot means, all for the purpose of relieving plastic line tubing with which such fittings are associated from torque stresses which might otherwise be applied thereto by, for instance, a meter supported from risers extending from said fittings.

Further objects of the invention will appear as the description proceeds.

To the accomplishment of the above and related objects, our invention may be embodied in the form illustrated in the accompanying drawings, attention being called to the fact, however, that the drawings are illustrative only, and that change may be made in the specific construction illustrated and described, so long as the scope of the appended claims is not violated.

FIG. 1 is an elevation of a meter setter constructed in accordance with the present invention, connected in a line and supporting a meter;

FIG. 2 is a perspective view, drawn to an enlarged scale, of the novel fitting constituting an element of the setter; and FIG. 3 is a perspective view of the setter, installed in a line and ready for reception of a meter, and illustrating the above-mentioned foot means.

In the drawings, we have suggested a water meter in block outline at 10, said meter being connected, through our novel setter means, between two separated sections 11 and 12 of a supply or service line formed of plastic conduit. Identical, but allochirally arranged, fittings 13 and 14 are connected, respectively, to said line sections 11 and 12. Each such fitting comprises a first arm 15 externally threaded for the reception of a pack joint 16, and an internally threaded second arm 17 which is angularly related to the first arm 15. Risers 18 and 19 which may preferably be plastic conduit sections are respectively threadedly received in the arms 17 of the two fittings. At its upper end, the riser 18 carries a stop valve 20 while the riser 19 carries at its upper end an elbow 21. Couplings 22 mounted upon the stop valve 20 and the elbow 21 are threadedly engaged with the conventional meter spuds 23, 23 to support the meter and to connect it in the line 11, 12.

Each fitting 13, 14 is formed to provide integral, rigid prong means 24 coaxial with its first arm and extending oppositely relative to said first arm. Each such prong means comprises an abutment face 25 substantially normal to the axis of the arm 15, and, in the preferred embodiment of the invention, a plurality of radially-extending, axially-elongated, peripherally-spaced wings or vanes 26.

Connector means 27 is arranged between the fittings 13 and 14. Said connector means is hollow, at least at its opposite end regions 28 and 29, and may be formed of any suitable material, though it may preferably be a section of plastic conduit. The internal diameter of the end regions 28 and 29 of the connector means 27 is less than the diameter of the abutment face 25 and at least as small as the maximum transaxial dimension of the wing series 26. Thus, when the winged prong means of a fitting 13 or 14 is entered in one end 28 or 29 of the connector means 27, it will have a very snug fit therein. In fact, when the element 27 is a section of plastic conduit, its internal diameter will preferably be slightly less than the maximum transaxial dimension of the wing series, whereby the conduit will be somewhat distorted by entry of a prong means therein.

Preferably, a transaxial bore 30 will penetrate the wings of the prong means 24; and, when such a prong means has been fully entered in an end of the connector element 27, a pin 31 will be driven through the connector means wall and the bore 30 to hold each prong means and the connector element 27 affirmatively against relative rotation.

As will be clear from the drawings, each prong means 24 is substantially coaxial with the first arm 15 of its fitting 13 or 14 whereby, in the illustrated embodiment of the invention, the arms 15, the prong means 24 and the connector means 27 all are disposed upon a common axis.

Each fitting 13, 14 further comprisees an eye or ring means integrally disposed between the body of the fitting and the abutment element 25, the axis of said eye 32 being perpendicular to the plane defined by the axes of the angularly related fitting arms 15 and 17. Each eye is designed and intended for the snugly-slidable reception of a foot bar 33 which is adapted to be substantially centered in its eye 32 to project substantially equally oppositely beyond the common plane of the axes of the risers 18 and 19. Obviously, the foot bars 33, when so disposed, and when resting upon the bottom of a pit or other floor substantially at the level of the line portions 11 and 12, will affirmatively restrain the entire setter assembly against undesired rotational movement about the axis of the line sections 11 and 12. If desired, for use in a particular environment in which the floor is significantly below the level of the line sections 11 and 12, the foot pieces 33 may be curved so that their opposite ends are disposed correspondingly below the level of the line sections, the eyes or ring means 32 being relatively short in the direciton of their axes so that such curved elements may readily be threaded therethrough.

Thus, the invention resides in the provision of vaned prong means, rigid with elbow fittings and coaxial with one arm thereof, for non-rotational reception in the unthreaded, hollow ends of a connector element, and/or the provision of eye means on such fittings for the reception of foot means, all for the purpose of relieving plastic line tubing with which such fittings are associated from torque stresses which might otherwise be applied thereto by, for instance a meter supported from risers extending from said fittings.

What is claimed is:

1. A meter setter comprising a pair of base elbow fittings, each having a first arm designed for reception of a coupling and each having a second arm designed for reception of a riser, said first and second arms of said fittings being correspondingly angularly related to each other and the first arms of said fittings being substantially coaxially arranged, rigid, vaned prong means fixedly carried by each fitting, substantially coaxial with the first arm thereof and extending away from the axis of said second arm in a direction opposite the direction of extension of the axis of said first arm, said fittings being arranged with the prongs extending toward each other, unthreaded connector means, hollow at least at its opposite ends, disposed between said fittings and receiving said prongs, respectively, within its said opposite ends, means for restraining said prongs against rotational movement about their axes relative to said connector means, risers supported from the second arms of said fittings, elbows at the distal ends of said risers, and coupling means carried by said elbows and disposed on a common axis for connection to the spuds of a water meter to be supported by said setter.

2. The meter setter of claim 1 in which at least one of said fitting is formed to provide an eye upon an axis perpendicular to the plane defined by the axes of the arms of said fitting, and foot means snugly slidably received in any such eye and extending oppositely beyond the axis of said connector means.

3. The meter setter of claim 1 in which the vanes of said prong means constitute a plurality of radially-extending, axially-elongated wings grouped about the axis of said prong means in peripherally-spaced relation.

4. The meter setter of claim 1 in which said connector means is a plastic conduit having an internal diameter at least as small as the maximum transaxial dimension of said prong means.

5. The meter setter of claim 1 in which said prong means is formed to define a plurality of identically-dimensioned, radially-extending, axially-elongated wings symmetrically grouped about the axis of said prong means, and said connector means is a plastic conduit having an internal diameter at least as small as the maximum transaxial dimension of said prong means.

References Cited

UNITED STATES PATENTS

| 866,952 | 9/1907 | McKee | 285—30 |
| 1,988,003 | 1/1935 | Ford | 285 —30 |
| 2,489,660 | 11/1949 | Mueller | 285—30 |
| 2,564,428 | 8/1951 | Ford et al. | 285—30 |
| 2,748,800 | 6/1956 | Allen | 73—201 X |
| 2,892,641 | 6/1959 | Ford | 285—30 |
| 3,278,209 | 10/1966 | Winikoff. | |

FOREIGN PATENTS

| 17,280 | 3/1956 | Germany. |
| 776 | 1889 | Great Britain. |

DAVID J. WILLIAMOWSKI, Primary Examiner

D. W. AROLA, Assistant Examiner

U.S. Cl. X.R.

285—179, 404